June 21, 1955 T. GULBRANDSEN 2,711,270
MEAT CUTTING MACHINE
Filed July 21, 1950 6 Sheets-Sheet 1

Fig.1

INVENTOR.
TRYGVE GULBRANDSEN
BY
J. Stanley Churchill
ATTORNEY

United States Patent Office 2,711,270
Patented June 21, 1955

2,711,270

MEAT CUTTING MACHINE

Trygve Gulbrandsen, Beverly, Mass., assignor, by mesne assignments, to John E. Smith's Sons Company, Buffalo, N. Y., a corporation of New York Application July 21, 1950, Serial No. 175,246

15 Claims. (Cl. 222—162)

This invention relates to a meat cutting machine.

The invention has for an object to provide a novel and improved meat cutting machine for use in preparing meat for the manufacture of frankfurters, sausages, and for similar purposes adapted to cut and discharge the meat in a rapid, superior, and sanitary manner.

With this general object in view, and such others as may hereinafter appear, the invention consists in the meat cutting machine and in the various structures, arrangements, and combinations of parts hereinafter described and particularly defined in the claims at the end of this specification.

In the drawings illustrating the preferred embodiment of the invention.

In general, the present invention contemplates a meat cutting machine for preparing meat for use in the production of frankfurters, sausages, and the like, and in general comprises a rotating bowl having an annular meat trough semicircular in cross section, a plurality of knives mounted for operation in the bowl for cutting the meat as it is advanced by the rotating bowl, and unloading means for discharging the prepared meat from the bowl. The handling of meat in such machines is subject to rigid inspection by the Bureau of Animal Industry, requiring extreme sanitation in the handling of the meat and elimination of structure forming pockets or recesses in the cutting area in which the meat might become lodged and rendered relatively inaccessible during the cleaning operation.

One feature of the present invention includes novel means for mounting and adjusting the cutting knives or blades relative to the rotating bowl, the individual knife units being clamped together side by side, and the adjusting mechanism of one unit being entirely covered and protected by a contiguous unit whereby to present a relatively smooth outer surface free of recesses and which may be easily cleaned. Novel clamping means for the cutting knives is also provided disposed beyond and accessible from outside of the cutting area and which is conducive to sanitary operation. Provision is also made for sealing the upper surface of the rotating bowl adjacent the cutting area in a novel manner arranged to automatically take up any wear and to assure a tight seal, and novel crank operated means disposed outside the bowl area is provided for raising and lowering the usual hood fitted over the knife unit during the cutting operation. Provision is also made for driving and guiding the rotating bowl concentrically with relation to its supporting frame in a novel manner whereby to eliminate lateral displacement of the bowl and to positively maintain the bowl in operative relation to the cutting knives.

Another feature of the present invention relates to a novel unloading disk adapted to be lowered into the annular trough to effect discharge of the prepared meat over the side of the bowl, the meat being guided by a chute into a suitable receptacle. The unloading disk is located non-radially with respect to the bowl and at a slight rearwardly inclined angle from the vertical to effect a rapid discharge of the meat, and provision is made for mounting the disk for both vertical and angular adjustment to fit the circular disk into the offset or non-radial portion of the arcuate trough with which it cooperates for most efficient operation. Novel provision is also made for pneumatically lowering the unloading disk into the bowl to effect the discharge of the prepared meat, and for again elevating the disk out of the bowl preparatory to a subsequent or succeeding cutting operation. In practice, the unloading unit is preferably moved bodily into and out of the path of the meat in the trough through a substantially vertical path so as to cause the angularly disposed disk to cut or slice down into the advancing meat mixture during the rotation of the bowl, and provision may also be made for automatically starting rotation of the disk during its initial descent into the trough and for automatically discontinuing rotation thereof when the disk is elevated out of the trough.

Figure 1:
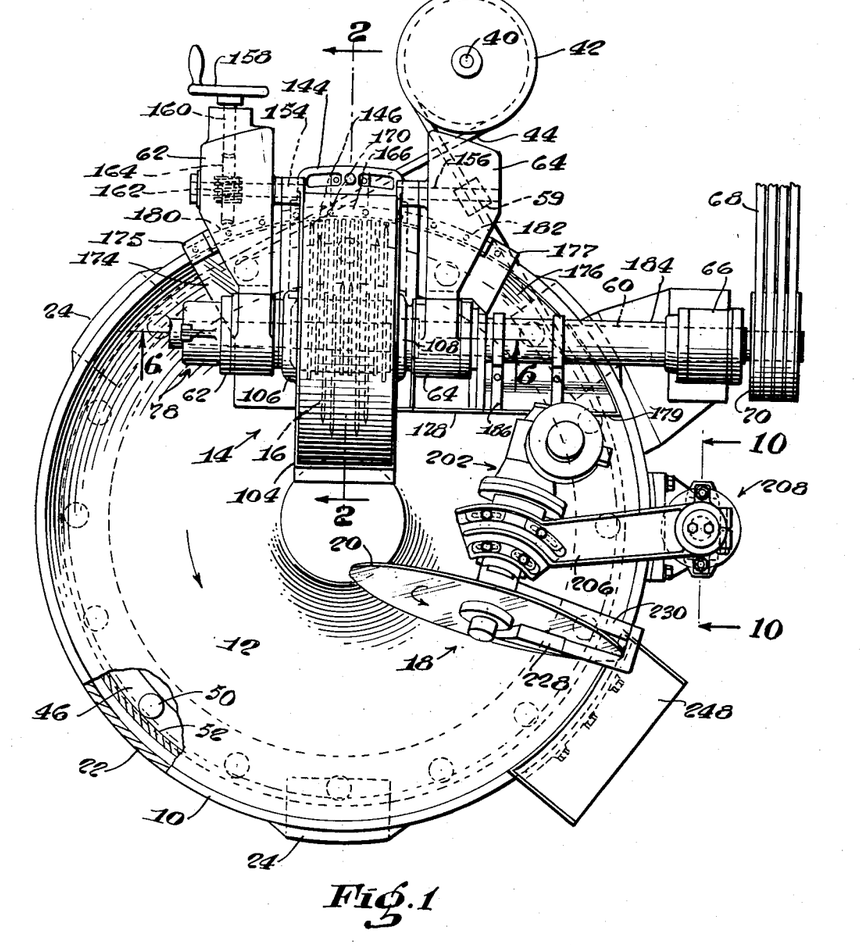
Fig. 1 is a plan view of the present meat cutting machine.

Referring now to the drawings and particularly to Fig. 1, the present meat cutting machine comprises in general meat conveying means including a rotary bowl 10 having an annular trough 12 substantially semi-circular in cross section and into which the meat to be cut is deposited; meat cutting means, indicated generally at 14, and comprising a plurality of knives 16 mounted to rotate in and cooperate with the annular trough to cut the meat as it is advanced; and meat unloading means, indicated generally at 18 and including a flat circular disk 20 arranged to be lowered into the annular trough to effect discharge of the prepared meat from the trough and over the side of the bowl.

Figures 2, 2A:
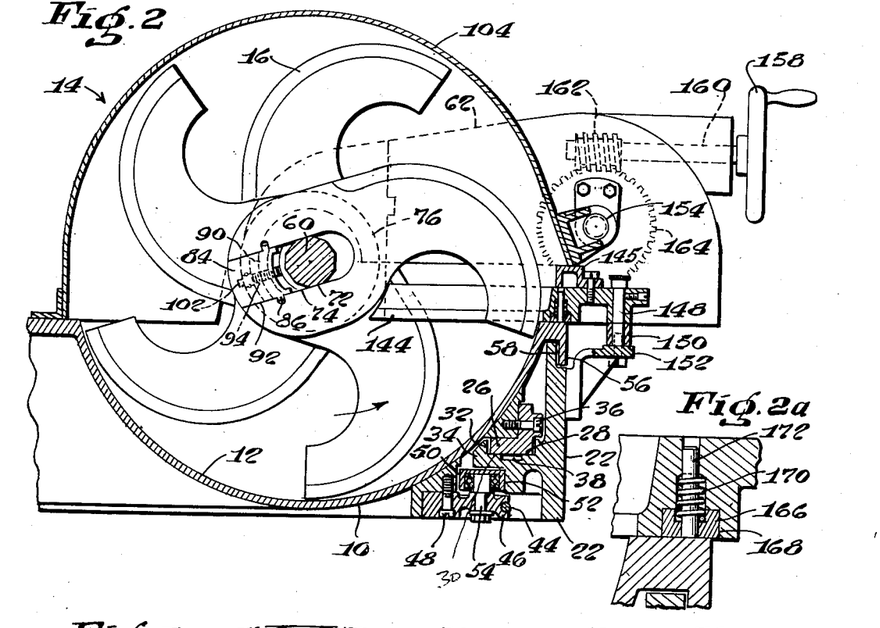
Fig. 2 is a cross-sectional view taken on the line 2—2 of Fig. 1.
Fig. 2a is a cross-sectional detail view of a sealing bar for cooperation with the upper surface of the rotating bowl adjacent the cutting area.

As illustrated in Fig. 1, the bowl 10 is arranged to be rotatably supported in a cylindrical frame member 22 supported from the floor by legs 24, and as better shown in Fig. 2, the bowl 10 is provided with an annular member 26 having a flat bearing surface 28 arranged to slidingly engage a flat bearing surface 30 comprising the bottom wall of an annular grooved track 32 formed in an inwardly extended flanged portoin 34 of the cylindrical frame 22. The annular bearing member 26 may be secured to the undersurface of the bowl by screws 36, and the annular bearing surface or circular track 32 may be provided with a recessed portion into which may be placed a ring of lubricating felt 38 or the like.

The annular bowl 10 may be rotated from a drive shaft 40 having a pulley 42 connected by a belt 44 to a large diameter pulley 46 comprising an annular member secured to the underside of the bowl by screws 48 as shown in cross section in Fig. 2, and in order to adjustably maintain the bowl concentric with its supporting frame 22, a plurality of rollers 50 carried by the annular pulley member 46 are arranged to engage and cooperate with a cylindrical surface 52 formed in the inwardly extended flange portion 34 of the frame. The rollers 50 may and preferably will be mounted on eccentric studs 54 to permit adjustment of the rollers with relation to the cylindrical surface 52 whereby to assure a concentric relationship between the bowl and the support and to maintain the bowl in operative relation to the cutting knives 16. As illustrated in Fig. 2, the upper edge of the bowl may be provided with a depending lip portion 56 overhanging the upper edge of the cylindrical supporting frame 22, and the latter may be recessed as indicated at 58 to provide a clearance for the depending lip 56 and to permit the outside diameter of the bowl to be substantially flush with the outside diameter of the cylindrical frame. The shaft 40 may be driven in any usual or preferred manner, not shown, and the belt 44 may and preferably will comprise a steel cable coated with a nylon material to provide a flexible smooth coated belt which is less subject to ascumulation of foreign matter than conventional belting and, therefore, conducive to sanitary operation. Provision may also be made for cleaning the belt by running it between a pair of felt wipers suitably supported and covered so as to continuously wipe the belt during the operation of the machine, as indicated at 59.

Figures 6, 7, 8, 9:
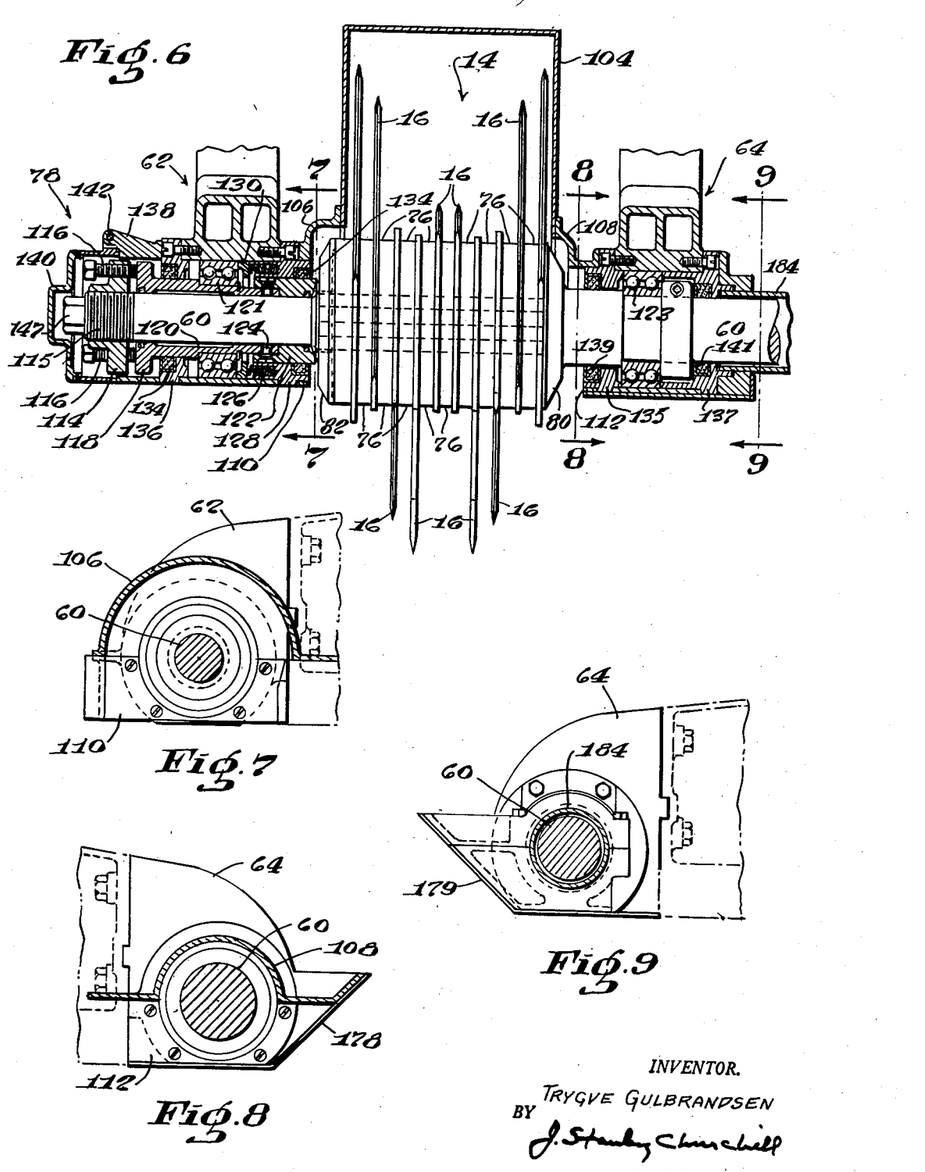
Fig. 6 is a cross-sectional view taken on the line 6—6 of Fig. 1 showing the knife mounting and clamping mechanism.
Figs. 7, 8, and 9 are cross-sectional detail views taken on the lines 7—7, 8—8, and 9—9 respectively of Fig. 6.

Referring now to Figs. 1, 2, and 6, the cutting knives 16 are mounted on a shaft 60 supported in detachably connected bearing portions of bearing brackets 62, 64 and in an outboard bracket 66 attached to the cylindrical frame member 22, the shaft being driven through any usual or preferred driving means connected by a belt 68 to a pulley 70 secured to the shaft 60. The knives 16 which may comprise curved blades, as shown, are adjustably mounted on the shaft 60, the portion of the shaft on which the knives are mounted being preferably decagonal in shape, as indicated at 72, and the inner ends of the knives are provided with slotted portions 74 arranged to fit over opposing parallel sides of the decagon to securely position the knives angularly on the shaft, successive blades being positioned at progressive angles about the decagon. The individual knife blades are adjustably supported by and between spacing collars 76 also fitted over the decagonal portion of the shaft, and the individual knife units are mounted side by side in clamped relation on the shaft by clamping means indicated generally at 78. The endmost cutter unit on the right hand side viewing Fig. 6 is arranged to engage a flanged portion 80 of the shaft 60, and the endmost unit on the left hand side is arranged to engage a separate collar 82 maintained in clamping engagement with the set of knives by the clamping means 78.

Figure 3:
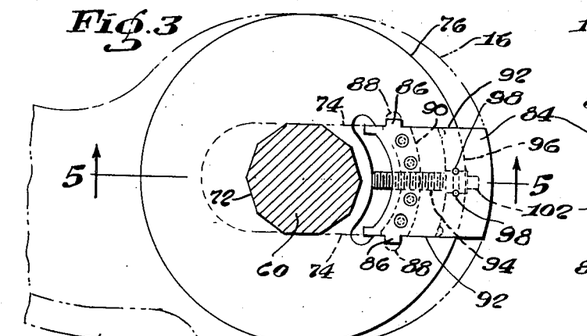
Fig. 3 is an enlarged detail view in front elevation of the knife adjusting mechanism.
Figure 4:
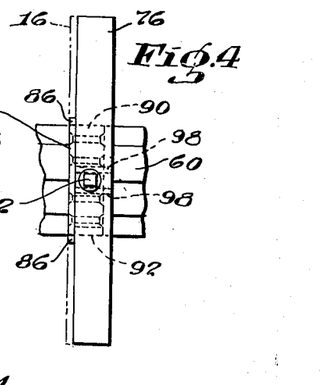
Fig. 4 is an end view detail of the same.
Figure 5:
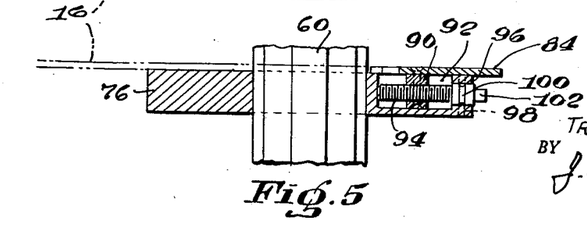
Fig. 5 is a cross-sectional view taken on the line 5—5 of Fig. 3.

As illustrated in Figs. 3, 4, and 5, the novel knife adjustment mechanism includes a filler piece 84 fitted into and closing the open end of the slotted portion 74, the filler piece corresponding in thickness to the knife 16, and the outer end of the filler piece being defined by a radius coextensive with the radius of the end of the blade. The filler piece 84 is provided with laterally extended ears 86 arranged to fit into slots 88 formed in the knife 16 so that the knife will move with the filler piece as a unit during the adjusting operation. As herein shown, the filler piece 84 is riveted to an adjusting member 90 movable in a radial slot 92 formed in one side or face of each spacing collar 76. The member 90 is arranged to cooperate with an adjusting screw 94 rotatably mounted in a rim portion 96 of the spacing collar, the rim portion defining the outer end of the radial slot. The adjusting screw 94 is held from longitudinal axial movement by a pair of opposed pins 98 carried by the rim portion and cooperating with a grooved portion 100 of the screw, and the inner end of the screw is arranged to engage the inner end of the radial slot 92, as shown. The screw 94 is provided with a relatively small square head 102 extending from the periphery of the spacing collar 76.

With this construction, it will be observed that rotation of the adjusting screw 94 will effect radial adjustment of the knife relative to the shaft 60, each knife being individually adjustable, the decagonal shaft portion 72 cooperating with the slot 74 preventing angular displacement of the knife, and the ears 86 on the filler piece cooperating with the slots 88 to prevent radial displacement of the knife. It will be further observed that the open areas on one side of a spacing collar 76 are closed by the adjacent face of a contiguous spacing collar held thereagainst in clamped relation so that any exposed recesses where meat may collect are avoided. The open side of the outermost right hand knife unit as viewed in Fig. 6 is closed by the flanged portion 80 of the shaft 60, as described.

Referring now particularly to Fig. 6, the novel clamping means 78 for the set of knife units 14 is disposed beyond and to one side of the cutting area, the cutting area being defined generally by a pivotally mounted arcuate hood 104 fitted over the cutting unit and provided with side members 106, 108 shaped to fit snugly over and in abutting relation with portions of the adjacent bearing brackets 62, 64 respectively and to abut with filler pieces 110, 112 attached to the brackets as illustrated in Figs. 7 and 8. The clamping mechanism 78 includes a flanged and internally threaded collar 114 adjustably mounted on a threaded portion 115 of the shaft 60 and rotatable with the shaft, and a plurality of clamping screws 116 carried by the collar 114 and engageable with a flanged face 118 of an elongated sleeve 120 slidingly fitted over and rotatable with the shaft 60. The sleeve 120 carries a roller bearing 121 which may be slidingly mounted in the bracket 62, and the inner end of the sleeve 120 may be provided with a reduced diameter portion fitted into a bored opening formed in a clamping member 122 also slidably mounted on the shaft 60 and connected to rotate with the sleeve by studs 124 carried by the clamping member 122. The studs 124 are threadedly engaged in the clamping member and are provided with reduced diameter ends extended into small clearance openings in the sleeve 120. The engaging end of the clamping member 122 is preferably formed dish shaped for cooperation with a correspondingly shaped convex face formed on the end of the clamping collar 82. A plurality of springs 126 carried in recessed portions of a flanged end disk 128 attached to the bracket 62 are arranged to engage an intermediate annular member 130 which in turn bears against the outer or stationary race of the roller bearing 121. With this construction it will be observed that when the clamping screws 116 are loosened the springs 126 tend to urge the roller bearing 121 and the elongated sleeve 120 outwardly along the shaft 60 to the extent to which the screws have been loosened, and the engaging member 122 is free to "float" between the clamping collar 82 and the reduced diameter end of the sleeve 120 to the extent of the clearance openings for the reduced diameter ends of the pins or screws 124. The clamping member 122 may and preferably will be relatively loosely fitted over the shaft 60 and within the flanged end cap member 128 so as to permit of a slight lateral movement of the member 122 relative to the clamping collar 82. Thus, in the operation of the apparatus, when the screws 116 of the clamping unit 78 are loosened, the knife units may be individually adjusted radially of the shaft 60 for proper cooperation with the bottom of the trough 12 for cutting the meat. Thereafter when the clamping screws 116 are again tightened the dish-shaped end of the floatingly mounted engaging member 122 is free to align itself with the correspondingly shaped face of the clamping collar 82 during the initial tightening operation to assure a uniform bearing and clamping engagement whereupon the screws 116 may be fully tightened to clamp the knife units in contiguous engagement as described.

In order to prevent foreign matter from entering the bearing unit 78 and to prevent lubrication from escaping therefrom, the end cap member 128 of the bearing 62 is provided with a sealing member 134 in encircling engagement with the engaging clamp member 122, and a second cap member 136 attached to the opposite end of the bearing bracket 62 may likewise be provided with a sealing member 134 encircling the sleeve member 120. A cylindrical hollow bracket 138 secured to and extending from the outer cap member 136 may be provided with a hinged cover 140 pivotally mounted at 142 in the bracket 138 to entirely enclose the outer end of the bearing and clamping unit. The outer end of the shaft 60 may be provided with a hexagonal head 147. The bearing unit 64 may also be provided with a ball bearing 123 and with flanged end cap members 135, 137 provided with suitable sealing members 139, 141 respectively encircling the shaft 60, as illustrated.

As illustrated in Figs. 1 and 2, a horizontally extended comb 144 is arranged to cooperate with the rotating cutter blades 16 of the cutting unit, the blades passing through and cooperating with the slotted portions 146 of the comb. In operation, the cutter blades are rotated in a counterclockwise direction transversely of the annular trough 12, as viewed in Fig. 2, so that the comb 144 serves to confine the meat in the cutting area and to cooperate with the blades to cut the meat. As indicated in Fig. 2, the comb is slidingly mounted in the cutting area between guides formed in the brackets 62, 64 and is arranged to be withdrawn from the chopping area for cleaning purposes. As herein shown, in order to lock the comb in proper relationship to the cutter blades 16, the outer end of the comb 144 is provided with a vertically removable pin 148 loosely mounted therein and arranged to be extended into an opening or locating socket formed in a stationary member 150 supported from the cylindrical frame member 22 by a bracket 152.

The arcuate hood 104 may be pivotally mounted to permit raising and lowering of the hood for cleaning and adjusting purposes, and as herein shown, the hood is supported between the brackets 62, 64, upon studs 154, 156, journaled in the brackets 62, 64 respectively, and provision is made for facilitating manual raising and lowering of the hood through connections from a crank 158. As illustrated in Figs. 1 and 2, the crank 158 is mounted fast on a shaft 160 journaled in the bracket 62, the shaft 160 being also provided with a worm gear 162 fast thereon arranged to mesh with a worm gear 164 which is fast on an extension of the pivot stud 154. Thus, in the operation of the machine, the relatively heavy arcuate hood 104 fast on the end of the pivot stud 154 may be easily and quickly raised and lowered into and out of operative relation with the cutting unit 16. As above described, the portions of the hood adjacent the bearing units 62, 64 are fitted snugly over the inner ends of the bearings, and the adjacent lower edges of the hood may be flanged and extended to cooperate with portions of the brackets 62, 64 to prevent escape of meat therethrough. The rear edge of the arcuate hood 104 may engage a filler piece 145 secured to the upper surface of the comb 144, as indicated in Fig. 2, to provide a tight seal.

Provision is made for sealing the engaging portion of the comb 144 with the bowl in a manner such as to automatically take up any wear along the outer and upper edge of the rotating bowl 10, and as herein shown, an arcuate sealing bar 166 may be fitted into a recessed portion 168 formed in the underside of the comb 144, the sealing bar being spring-pressed into engagement with the upper edge of the bowl by a coil spring 170 interposed between recessed portions of the comb and the sealing bar respectively. The spring 170 is coiled about a vertical guide pin 172 fixed in the sealing bar 166 and slidingly mounted in the comb 172, a plurality of such springs 170 being disposed along the sealing bar, as indicated in Fig. 1. Provision is also made for covering the areas immediately adjacent either side of the cutting unit, and as herein shown, top plates or covers 174, 176 may be suitably supported from the underside of the brackets 62, 64 respectively. As illustrated in Figs. 1, 8, and 9 the forward transverse edge of the cover member 176 may be flanged upwardly at an angle of about 45 degrees, as indicated at 178, 179, so as to guide and confine the meat being carried by the rotary bowl 10 under the cover member and into operative relation with the cutting unit 14. The cover members 174, 176 may be attached to brackets 175, 177 respectively which may and preferably will be removably secured to the brackets 62, 64 respectively, and as indicated in Fig. 1, the underside of the brackets 62, 64 and the coextensive portions of the brackets 175, 177 may be recessed to receive spring-pressed sealing bar units 180, 182 respectively similar to the sealing bar unit 166 provided in the comb 144, and are arranged to engage and form a tight seal with the upper and outer edge of the rotary bowl 10 adjacent the cutting area, the sealing bars being also adapted to automatically take up any wear along said upper edge. As illustrated in Figs. 1 and 6, the cutting unit shaft 60 may be provided with a stationary cylindrical sleeve 184 disposed between the bearing units 64, 66, and the forward edge 178 of the cover member 176 may be removably supported by straps 186 mounted on the stationary sleeve 184.

Figures 10, 11:
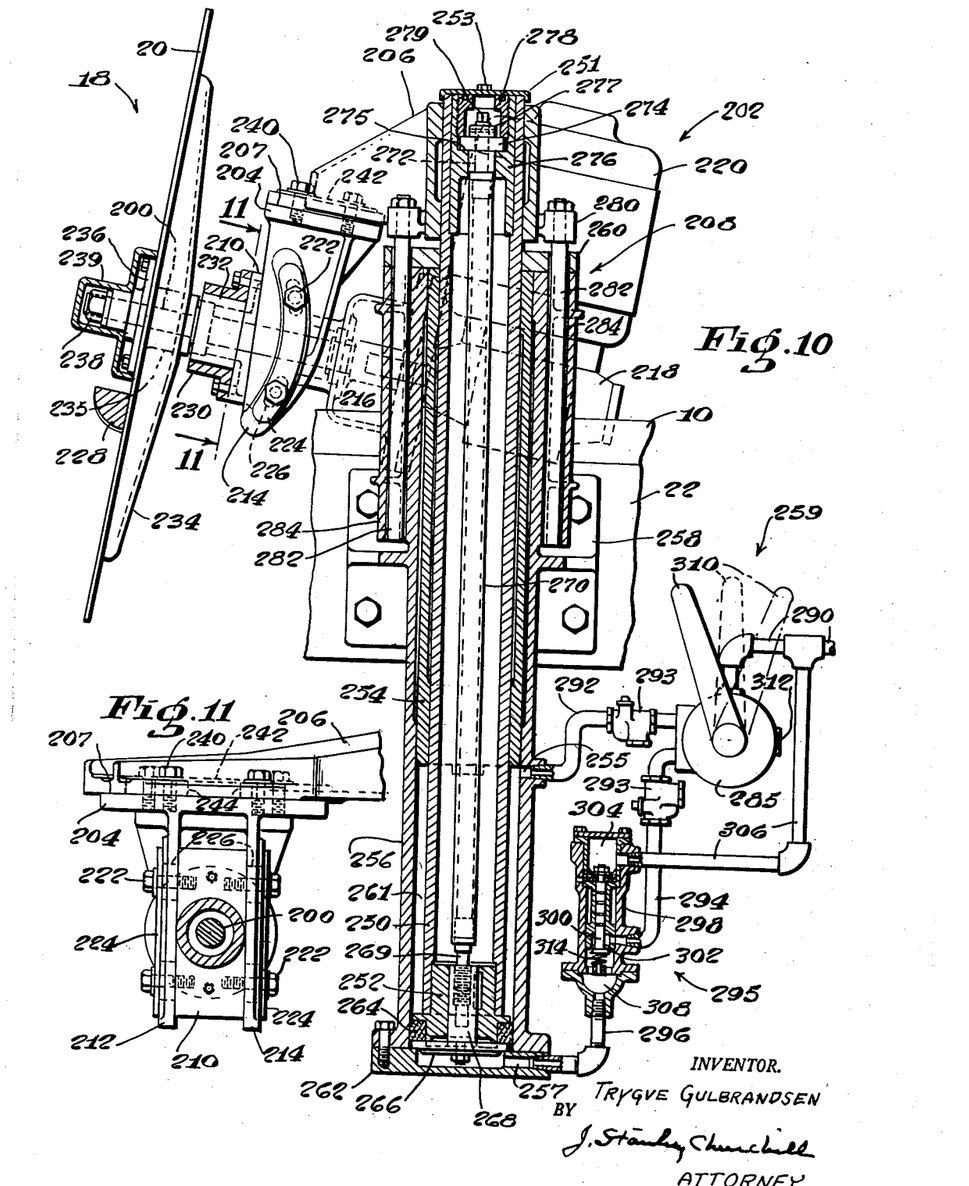
Fig. 10 is a side elevation of the unloading disk and the pneumatically operated lowering and elevating mechanism therefor, the pneumatically operated mechanism being shown in cross section.
Fig. 11 is a cross-sectional view taken on the line 11—11 of Fig. 10.

From the description thus far it will be seen that in the operation of the machine the meat deposited in the trough 12 of the rotary bowl 10 will be carried into engagement with the cutting knives 16 to effect cutting and mixing of the meat. In practice the bowl is arranged to be rotated at a rate of about 5 or 6 R. P. M. in a counterclockwise direction, as viewed in Fig. 1, while the cutting knife unit 14 is arranged to be rotated at a rate of about 1200 to 1300 R. P. M. The usual scrapers, not shown, may extend into the trough 12 for releasing any meat adhering to the walls of the bowl and for directing the meat toward the center of the trough. After a predetermined time, sufficient to effect complete cutting of the meat, provision is made for unloading the meat over the side of the bowl and into a suitable container adjacent thereto. As illustrated in Figs. 1 and 10, the unloading means comprises the flat circular disk 20 which is arranged non-radially with the respect to the radius of the bowl and is further arranged at a slight rearwardly inclined angle from the perpendicular. The unloading disk 20 is mounted for adjustment vertically and laterally relative to the trough to fit snugly into the arcuate and nonradial portion of the concave bowl 12, and as herein shown the disk 20 is mounted fast on one end of a shaft 200 forming part of a motor-driven assembly unit, indicated generally at 202, which is mounted for vertical angular adjustment in a bracket 204, which in turn is adjustably secured to a bracket 206 fast on the upper end of a pneumatically operated raising and lowering unit indicated generally at 208. As illustrated in Figs. 10 and 11 the motor-driven unit 202 includes a bracket 210 adjustably supported between the arms 212 and 214 of the bracket 204, the shaft 200 being supported in the bracket 210 and connected by a coupling 216 to a gear-reduction unit 218 and an electric motor 220 supported by and forming a part of the unit 202. The unit 202 is adjustably secured to the bracket 204 by bolts 222 which extend through openings in elongated arcuate washers 224 and through slotted arcuate openings 226 formed in the arms 212, 214 of the bracket 204, the bolts cooperating with threaded openings formed in the bracket 210, thus permitting angular adjustment of the rotary disk 20 with relation to the perpendicular. A suitable scraper arm 228 may be arranged to cooperate with the front or meat-contacting face of the rotary disk 20, the scraper being supported from a U-shaped bracket 230 extended around the rear face of the disk and secured to a hub portion 232 attached to the bracket 210. The relatively thin, flat unloading disk 20 may and preferably will be supported on one side by a reinforcing disk 234 having a hub portion 235 mounted on the shaft 200. The front or meat-engaging face of the disk may be provided with a flanged hub member 236 through which a reduced diameter threaded portion of the shaft 200 extends for cooperation with a clamping nut 238 for securing the disk unit to the shaft. A removable hood or cap member 239 may be placed over the flanged hub 236 and clamping nut 238 to prevent accumulation of meat thereon.

The bracket 206 extending from the upper end of the pneumatically operated elevating unit 208 may and preferably will be provided with an angular face 207 at its inner end extended at an angle substantially parallel to the inclined plane of the shaft 200, the bracket 204 being adjustably secured to the angular face 207 of the bracket 206 by bolts 240 arranged to extend through openings in elongated washers 242, through arcuate slotted portions 244 provided in the bracket 206, and into threaded openings in the bracket 204. Thus provision is also made for adjusting the unit 202 laterally with respect to the concave portion of the bowl 12. In practice, the nonradially disposed unloading disk 20 is preferably arranged along a line a distance forwardly from and substantially parallel to a radial line from the center of the bowl 10 and may be angularly disposed vertically so that the upper edge of the disk is inclined rearwardly at an angle of about 10 degrees from the perpendicular, vertical and lateral angular adjusament being obtained as described to fit the circular disk into the nonradial concave portion of the trough for most efficient operation.

In the operation of the machine the unloading disk rotating at a rate of about 100 R. P. M. in a counter-clockwise direction, viewing Fig. 1, effects lifting of the meat upwardly out of the bowl and into an outwardly and downwardly sloping chute 248 attached to the frame 22 and cooperating with the rotary bowl 10. During the unloading operation the meat being carried into engagement with the rotary disk 20 is caused to be raised with the ascending side of the disk, and the scraper arm 228 effects scraping of the meat from the disk, the co-operating action of the disk and scraper directing the flow of the meat over the outer rim of the trough adjacent the disk and onto the downwardly sloping chute 248.

During the cutting operation the unloading disk 20 is normally disposed in an elevated position out of the path of the meat being cut, and after the meat has been thoroughly cut the unloading unit is lowered into operative relation to the bowl to effect discharge of the meat therefrom, as described. Provision is made for pneumatically raising and lowering the disk into and out of the bowl, and as illustrated in Fig. 10, the pneumatically operated elevating mechanism 208 includes an elongated sleeve 250 having a piston member 252 secured to the lower end thereof. The sleeve 250 is slidingly mounted in a stationary sleeve 254 which in turn is supported in an outer supporting bracket 256 having an extended portion 258 attached to the supporting frame 22. The upper end of the outer bracket 256 is provided with an upper cap member 260 through which the sleeve 250 extends, and the lower end of the outer bracket 256 is provided with an end cap member 262, the space within the outer bracket between the lower end cap member 262 and the lower edge of the inner supporting sleeve 254 defining a cylinder chamber 261 having an upper port 255 and a lower port 257 in communication with the pneumatic control mechanism indicated generally at 259. The piston includes a suitable piston ring or washer 264 preferably of a yieldable material mounted in a recessed portion of the piston member 252, and provision is made for supporting the ring in operative relation to the piston member and for effecting lateral expansion thereof into engagement with the walls of the cylinder chamber through connections from the upper end of the sleeve 250. As herein shown, the expanding mechanism may include a bottom plate 266 engaging the underside of the annular member 264. The plate 266 is connected to a cylindrical member 268 loosely extended through and keyed to the piston member 252 to permit vertical sliding movement of the member 268 in the member 252 and preventing rotation of the parts relative to each other. The member 268 is provided with a threaded opening at its upper end for cooperation with a threaded member 269 fast on the lower end of an elongated sleeve or hollow pipe 270, the upper end of the pipe 270 being provided with a member 272 fast thereon and extended through a bushing 274 fitted into and secured to a shouldered portion 275 of a cylindrical member 276 mounted fast in the upper end of the sleeve 250, the bushing 274 forming a bearing for the member 272 on the upper end of the elongated pipe 270. The member 272 is provided with a collar 277 fixed thereto and engageable with the upper surface of the bushing 274, and a square head 279 on the upper end of the member 272 is accessible through the top of the sleeve 250 for cooperation with a wrench to effect tightening of the unit. In operation, rotation of the elongated pipe 270 and the threaded member 269 fast thereon and cooperating with the threaded opening in the member 268 effects clamping of the plate 266 against the undersurface of the ring 264 to expand the same laterally against the cylinder walls. A threaded sleeve 278 having spanner wrench openings is threadedly engaged with the upper end of the sleeve 276 and is arranged to bear against the upper surface of the bushing 274, and a removable cap 251 is fitted over the top of the sleeve 250 and secured to the member 278 by bolts 253 to enclose the upper end of the sleeve 250. The bracket 206 is provided with laterally extended ears 280, each carrying a vertical rod 282, square in cross section, and slidingly mounted in vertically grooved portions 284 of the outer bracket 256 in order to prevent rotary movement or binding of the pneumatic unit during the elevating operation.

As illustrated in Fig. 10, the raising and lowering of the piston sleeve 250 and the unloading disk unit attached thereto may be controlled by a three-way valve 285 forming a part of the control mechanism 259. As herein shown, the control valve 285 is connected to a source of compressed air through a pipe 290 and is connected to the upper port 255 of the cylinder chamber 261 by a pipe 292, the pipe 292 having a commercial speed control valve 293 incorporated therein. The lower port 257 of the chamber 261 is connected to the control valve 285 by a pipe 294, safety valve unit 295, and pipe 296, the pipe 294 also having a commercial speed control valve 293 connected therewith. The safety control valve 295 includes a casing 298 having a spring-pressed valve member 300 cooperating with a valve seat 302. An upper chamber 304 formed in the casing 298 is in direct communication with the main source of air 290 through the pipe 306 and is arranged to maintain the valve member 300 open during normal operation of the machine so that the compressed air may enter through pipe 294 into the lower chamber 308 of the safety valve unit 295 and through the port 257 of the cylinder chamber 261. In the operation of the device when the valve handle 310 is moved to the right hand position, indicated by broken lines in Fig. 10, air is permitted to enter the piston chamber through port 257 to effect elevation of the piston and the unloading disk. Thereafter, when it is desired to lower the unit the valve handle 310 is moved to the left, or full-line position, as shown in Fig. 10 to permit air to enter the piston chamber 261 through the port 255 to effect lowering of the unit. The control valve 285 is provided with an exhaust outlet 312 to permit the air above the piston to be exhausted through the port 255 during the elevating operation and conversely to permit the air below the piston to be exhausted through the port 257 during the lowering operation of the unit. The intermediate or "hold" position of the valve handle 310, shown in dotted lines in Fig. 10 is arranged to close all of the ports in the valve 285 to permit the operator to stop elevation or descent of the unit in an intermediate position and to hold the unit in such intermediate position by the air entrapped in the cylinder. The object of the safety control valve unit 295 is to prevent sudden descent of the unit in the event of failure of the source of supply of compressed air in the main line 290. In the event of such failure when the unit is in its elevated position, the valve member 300 will be closed against its seat 302 by the spring 314, thereby locking the entrapped air in the chamber 261 and maintaining the unit in its elevated position. The main air line 290 may be provided with a controlled source of compressed air and may include the usual filter and lubricator, not shown.

From the description thus far it will be seen that in the operation of the machine the flat disk 20 may be caused to descend vertically into the oncoming meat in the annular trough, the nonradial and rearwardly inclined disposition of the disk effecting an angular cutting or slicing into the meat as it is advanced whereby to prevent objectionable smearing of the meat when coming into contact therewith and effecting rapid and efficient unloading of the meat from the trough.

Figures 12, 13:
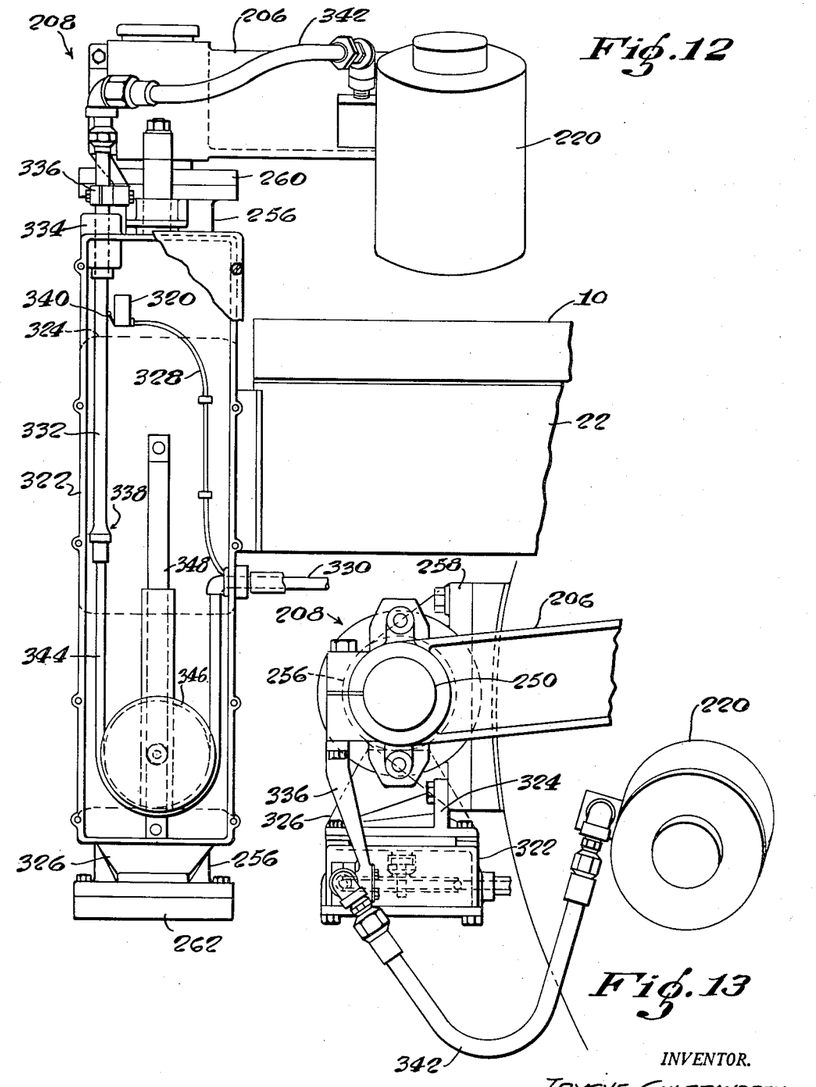
Figs. 12 and 13 are side elevation and plan views respectively of electrical control mechanism for automatically starting and stopping rotation of the unloading disk.

Provision may also be made in the preferred embodiment of the invention for automatically starting rotation of the unloading disk 20 during the initial descending movement of the unloading unit so that the disk will be rotating at full speed when it engages the meat, and for discontinuing rotation of the disk 20 when the unit is returned to its elevated position. As illustrated in Figs. 12 and 13, the starting and stopping of rotation of the disk 20 may be controlled by a normally closed micro-switch 320 supported in an elongated switch box 322 which is supported by brackets 324, 326 attached to the outer sleeve or cylinder bracket 256 of the pneumatically operated elevating mechanism 208 as shown in Figs. 12 and 13. The micro-switch 320 forms part of a circuit for controlling the unloading disk motor 220, and as herein shown the micro-switch is connected by wires 328 to the main leads entering the switch box through the main wire cable 330. An elongated hollow cable tube 332 is mounted for vertical reciprocation in a slide bearing 334 formed in the switch box 322, the upper end of the tube 332 being connected to and vertically movable with a bracket 336 secured to the hub portion of the unloading disk supporting bracket 206 attached to the upper end of the piston sleeve 250 of the pneumatically operated mechanism. The lower end of the elongated cable tube is provided with a flared or bell-shaped cam portion 338 arranged to engage a switch arm 340 of the normally closed micro-switch to open the circuit to the motor 220 when the unloading unit is in its elevated position. When the pneumatically operated unloading unit is caused to descend, the circuit to the motor 220 will be closed at the micro-switch 320 to start rotation of the unloading disk 20.

As herein shown, the vertically reciprocable cable tube is connected at its upper end by a flexible cable 342 leading to the motor terminal box, and the lower end of the tube extending into the switch box 322 is connected by a flexible cable 344 leading to the main wire cable 330. In order to guide and control the slack end of the flexible cable 344 and to confine the same within the enclosed switch box 322 during elevation and descent of the cable tube 332, the flexible cable 344 is arranged to run around a weighted pulley 346 mounted for vertical reciprocation on a slide bar 348 secured to the switch box 322, as illustrated. Thus, in the operation of the electric control mechanism it will be seen that during the initial descending movement of the unloading unit the circuit to the motor 220 will be closed at the micro-switch to start rotation of the disk 20 so that when it engages the meat in the trough the disk will be rotating at full speed, and when the unloading operation is completed, raising of the unloading unit to its maximum position of elevation will open the circuit to stop rotation of the disk.

In the operation of the present meat cutting machine, the meat to be cut is deposited in the trough 12 and carried into engagement with the cutting unit 14 to be thoroughly cut, the cutting operation being continued until a proper consistency and admixture is obtained whereupon the unloading disk unit 18 is pneumatically lowered into the trough to effect discharge of the meat over the side of the bowl. The present meat cutting machine is provided with novel cutting mechanism having provision for individually adjusting and clamping the cutter blades, and which is of a construction which may be easily cleaned, and which is conducive to sanitary operation. The machine is further provided with novel sealing means along the upper edge of the bowl adjacent the cutting area to prevent escape of the meat or meat juices during the cutting operation, the sealing means being arranged to automatically take up any wear along the top of the bowl and assuring a continuous seal adjacent the cutting area. Provision is also made for guiding the rotary bowl concentrically with the supporting frame and for maintaining the bowl in operative relation to the meat cutting unit. It will be observed that the present unloading disk unit disposed nonradially and at a rearwardly inclined angle from the vertical may be adjusted both laterally and vertically for cooperation with the nonradial and concave portion of the trough for rapid and efficient unloading of the meat, and that the unloading unit is preferably caused to move in a vertical path into and out of the trough. It will be further observed that the descent and elevation of the unloading unit may be effected pneumatically, and that provision is made for electrically controlling starting and stopping of rotation of the unloading disk upon descent and elevation respectively of the unloading unit.

Figures 14, 15:
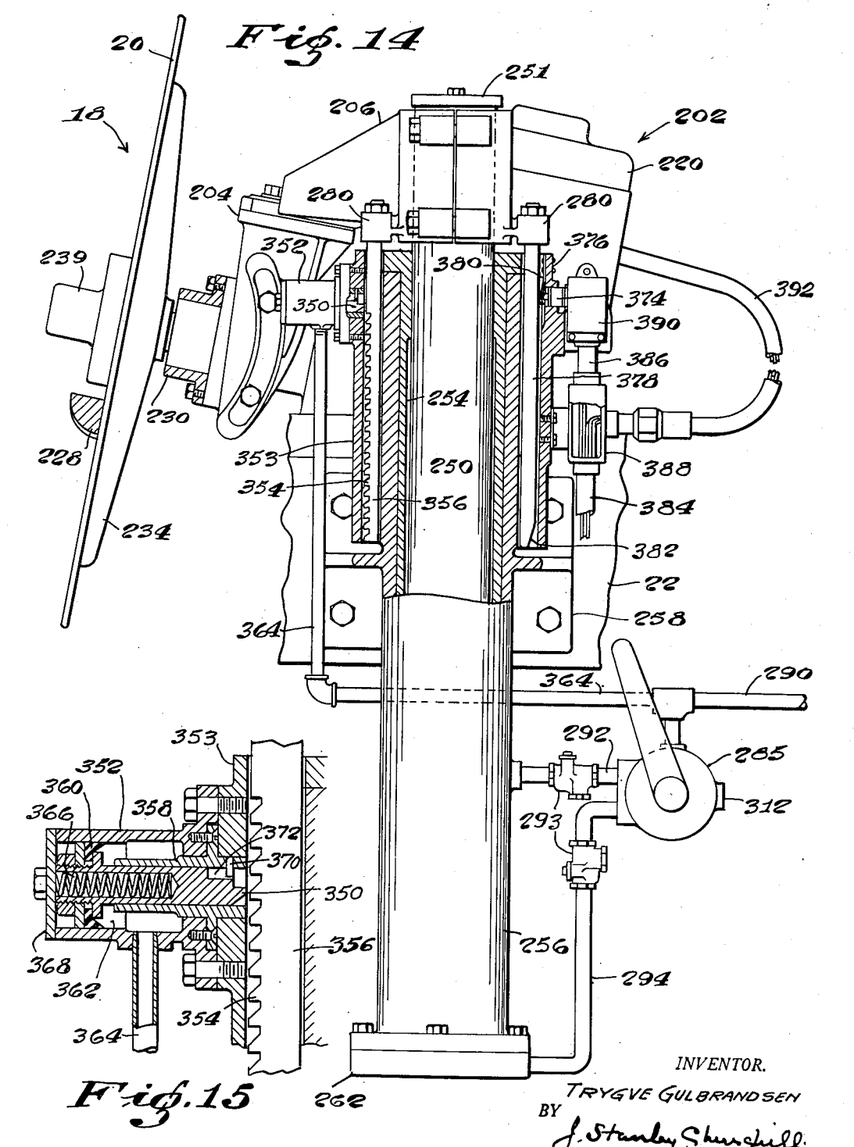
Figs. 14 and 15 illustrate a modified form of control mechanism to be described.

Referring now to Figs. 14 and 15, a modified form of pneumatically operated control mechanism is therein illustrated for preventing rapid descent of the piston sleeve 250 and the unloading unit carried thereby in the event of failure of the source of supply of the compressed air in the main line 290. As herein shown, the modified safety device comprises a pneumatically controlled spring-pressed latch 350 slidingly mounted in a housing 352 attached to a guide bracket 353 on one side of the supporting sleeve 256, the latch 350 being arranged to cooperate with rack teeth 354 formed in a vertically reciprocal guide rod 356 which is attached to and movable with the bracket 206. The latch 350 is slidingly supported in a sleeve 358 mounted in the housing 352 and is provided with a piston 360 fast thereon which is slidingly mounted in a chamber 362 formed in the housing, the chamber 362 being connected by a pipe 364 to the main line 290, as illustrated. During normal operation, the piston 360 is urged to the left to retain the latch 350 out of engagement with the rack teeth 354. However, in the event that the air pressure in the main line 290 is discontinued, the spring 366 will urge the latch to the right to engage with the rack teeth 354 thus terminating descent of the unloading unit and holding the same in its terminated position. Upon resumption of the air pressure, the latch will again be moved to the left to permit normal raising and lowering of the unloading unit. As herein shown, the spring 366 is fitted into a socket formed in the latch 350 and is arranged to bear against an end plate 368 of the housing 352. The latch member is preferably cylindrical in cross section, and a pin 370 carried by the sleeve 358 is arranged to be received in a slot 372 in the latch to prevent rotation of the latch.

A modified form of electrical control mechanism is also illustrated in Fig. 14, herein shown as comprising a normally open micro-switch 374 mounted on the opposed guide bracket 376 attached to the sleeve 256 and arranged to cooperate with a vertically reciprocal guide rod 378. A leaf spring switch arm 380 attached to the inner surface of the grooved guide bracket 376 is arranged to be engaged by the adjacent face of the guide rod 378 to hold the micro-switch in its closed position to close the circuit to the motor 220 during the unloading operation. As herein shown, the lower end of the guide rod 378 is beveled inwardly, as indicated at 382, so that in operation, when the unloading unit is in its fully elevated position, the spring arm 380 is permitted to spring away from the micro-switch 374 to open the circuit to the motor and thus stop rotation of the unloading disk 20. Conversely, when the unloading unit is caused to start its descent, the rod 378 effects closing of the circuit to start rotation of the unloading disk. The wiring may be led from the main line to the micro-switch 374 through conduits 384, 386 and the usual electrical boxes 388, 390 supported from the bracket 376, and may be led from the box 388 to the motor 220 through a flexible cable 392, as shown.

While the preferred embodiment of the invention has been herein illustrated and described it will be understood that the invention may be embodied in other forms within the scope of the following claims.

Having thus described the invention, what is claimed is:

1. In a meat cutting machine of the character described, a rotary bowl having an annular material receiving trough substantially semi-circular in cross section, and unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the nonradial portion of the semi-circular trough for cooperation therewith to effect discharge of the material over the outer rim of the rotary bowl, and means independent of the rotary bowl for rotating said flat disk.

2. In a meat cutting machine of the character described, a rotary bowl having an annular material receiving trough substantially semi-circular in cross section, unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the non-radial portion of the semi-circular trough for cooperation therewith to effect discharge of the material over the outer rim of the rotary bowl, means independent of the rotary bowl for rotating said disk, and means for angularly adjusting said circular disk laterally and vertically relative to said trough.

3. In a meat cutting machine of the character described, a rotary bowl having an annular material receiving trough substantially semi-circular in cross section; unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the non-radial portion of the semi-circular trough for cooperation therewith to effect discharge of the material over the outer rim of the rotary bowl, means independent of the rotary bowl for rotating said flat circular disk, and means for moving said unloading means in a vertical path into and out of operative relation to the trough, the disposition of the flat disk effecting a clean angular slicing into the advancing material during the vertical descent of the disk.

4. In a meat cutting machine of the character described, a rotary bowl having an annular material receiving trough substantially semi-circular in cross section, unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the non-radial portion of the semi-circular trough for cooperation therewith to effect discharge of the material over the outer rim of the rotary bowl, means independent of the rotary bowl for rotating said flat circular disk, and pneumatically operated means for moving said nonradially and rearwardly inclined unloading disk in a vertical path into and out of operative relation to said trough whereby to effect a clean angular slicing into the advancing material during the vertical descent of the disk.

5. In a meat cutting machine of the character described, a rotary bowl having an annular material receiving trough substantially semi-circular in cross section, unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the non-radial portion of the semi-circular trough for cooperation therewith to effect discharge of the material over the outer rim of the rotary bowl, means independent of the rotary bowl for rotating said flat circular disk, and pneumatically operated means for moving said unloading means vertically into and out of operative relation to the trough, said pneumatically operated means including a source of compressed air, and normally open valve means operatively connected between said pneumatically operated means and said source of compressed air constructed and arranged to be automatically closed to prevent rapid descent of said unloading means in the event of failure of said source of compressed air.

6. In a meat cutting machine of the character described, a rotary bowl having an annular material trough, an unloading unit including a flat rotary unloading disk mounted to cooperate with the trough to effect discharge of the material from the bowl, and pneumatically operated means for moving said unloading unit vertically into and out of operative relation to the trough, said pneumatically operated means including a source of compressed air, and normally open valve means operatively connected between said pneumatically operated means and the source of compressed air constructed and arranged to be automatically closed to prevent rapid descent of said unloading unit in the event of failure of said source of compressed air.

7. In a meat cutting machine of the character described, a rotary bowl having an annular material trough, an unloading unit including a flat rotary disk mounted to cooperate with the trough to effect discharge of the material from the bowl, and pneumatically operated means including a source of compressed air connected to effect vertical raising and lowering of the unloading unit, and control means including a safety valve connected to and arranged to be normally maintained open by said source of compressed air to permit elevation of said unloading unit, and means for automatically closing said valve to prevent rapid descent of said unloading unit in the event of failure of said source of compressed air.

8. In a meat cutting machine of the character described, a rotary bowl having an annular material trough, an unloading unit including a flat rotary disk mounted to cooperate with the trough to effect discharge of the material from the bowl, and pneumatically operated means for moving said unloading unit vertically into and out of operative relation to the trough, said pneumatically operated means including a piston, a cylinder chamber having upper and lower air ports, a source of compressed air connected with said ports, control means including a manually operated valve for effecting raising and lowering of said piston in the chamber, and a safety valve between said control valve and said lower port, said safety valve being connected to and being normally maintained open by said source of compressed air, and means for automatically closing said safety valve to entrap the air in said chamber and thus prevent rapid descent of said unloading unit in the event of failure of said source of compressed air.

9. In a meat cutting machine of the character described, a rotary bowl having an annular material receiving trough substantially semi-circular in cross section, unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the nonradial portion of the semi-circular trough for cooperation therewith to effect discharge of the material over the outer rim of the rotary bowl, drive means independent of said bowl for rotating said disk, means for moving the unloading means vertically into and out of operative relation to said trough, and control means operatively connected to said drive means and actuated by movement of said unloading means for starting rotation of the disk upon initial descending movement thereof and for stopping rotation of the disk upon elevation thereof.

10. In a meat cutting machine of the character described, a rotary bowl having an annular material receiving trough substantially semi-circular in cross section, unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the nonradial portion of the semi-circular trough for cooperation therewith to effect discharge of the material over the outer rim of the rotary bowl, an electrical circuit including a motor for rotating said disk, means for moving said disk in a vertical path into and out of operative relation to said trough, and control means including a normally closed micro-switch in said motor circuit, and means carried by said unloading means arranged to cooperate with said micro-switch to open the circuit and discontinue operation of the motor upon elevation of said unloading means, and to permit closing of the circuit upon initial descending movement of said unloading means.

11. In a meat cutting machine of the character described, a rotary bowl having an annular material receiving trough substantially semi-circular in cross section, unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the nonradial portion of the semi-circular trough for cooperation therewith to effect discharge of the material over the outer rim of the rotary bowl, and means for mounting said disk to permit adjustment thereof laterally with respect to said trough, said mounting means including a supporting bracket, a bearing bracket, and arcuate slot and bolt connections between said brackets for fixedly retaining the disk in its adjusted position.

12. In a meat cutting machine of the character described, a rotary bowl having an annular material receiving trough substantially semi-circular in cross section, unloading means for discharging the material from the bowl comprising a flat rotatable circular disk mounted to be disposed laterally of the trough in a position parallel to but offset from a radial line from the center of the bowl and at an angle inclined rearwardly from the perpendicular with respect to the direction of rotation of the bowl, said flat disk having a radius greater than the radius of the semi-circular trough at said radial line whereby the periphery of the circular disk conforms substantially to the nonradial portion of the semi-circular trough for cooperation therewith to effect discharge of the material over the outer rim of the rotary bowl, and means for mounting said disk to permit adjustment thereof to vary the rearwardly inclined angularity of said disk, said mounting means including a supporting bracket, a bearing bracket, and arcuate slot and bolt connections between said brackets for fixedly retaining the disk in its adjusted position.

13. In a meat cutting machine of the character described, a rotary bowl having an annular material trough, an unloading unit including a flat rotary unloading disk mounted to cooperate with the trough to effect discharge of the material from the bowl, and pneumatically operated means for moving said unloading unit vertically into and out of operative relation to the trough, said pneumatically operated means including a source of compressed air, and safety control means operatively connected with and normally maintained in an inoperative position by said source of compressed air, said control means being arranged to automatically move into operative position to prevent rapid descent of said unloading unit in the event of failure of said source of compressed air.

14. In a meat cutting machine of the character described, a rotary bowl having an annular material trough, an unloading unit including a flat rotary unloading disk mounted to cooperate with the trough to effect discharge of the material from the bowl, and pneumatically operated means for moving said unloading unit vertically into and out of operative relation to the trough, said pneumatically operated means including a source of compressed air, and safety control means including a latch engageable with said pneumatically operated means operatively connected with and normally maintained in an inoperative position by said source of compressed air, said latch being arranged to be automaticaly released to engage said pneumatically operated means to prevent rapid descent of said unloading unit in the event of failure of said source of compressed air.

15. In a meat cutting machine of the character described, a rotary bowl having an annular material trough, an unloading unit including a flat rotary unloading disk mounted to cooperate with the trough to effect discharge of the material from the bowl, and pneumatically operated means for moving said unloading unit vertically into and out of operative relation to the trough, an electrical circuit including a motor for rotating said disk, and control means including a micro-switch in said motor circuit, and means carried by and movable with said unloading unit arranged to cooperate with said microswitch to permit opening of the circuit to stop rotation of the disk upon elevation of the unloading unit, and to effect closing of the circuit upon initial descending movement of said unloading unit.

References Cited in the file of this patent

UNITED STATES PATENTS

| | | |
|---|---|---|
| 993,967 | Debanche | May 30, 1911 |
| 1,127,587 | Carlin | Feb. 9, 1915 |
| 1,181,990 | Carlin | May 9, 1916 |
| 1,535,794 | Schmidt | Apr. 28, 1925 |
| 1,788,214 | Van Hooydonk | Jan. 6, 1931 |
| 1,962,459 | Ostlund | June 12, 1934 |
| 2,177,600 | Schmidt | Oct. 24, 1939 |
| 2,278,459 | McCashen | Apr. 7, 1942 |
| 2,508,460 | Latham | May 23, 1950 |
| 2,518,428 | McMurray | Aug. 8, 1950 |
| 2,549,657 | Zaenkert | Apr. 17, 1951 |
| 2,639,062 | Fox | May 19, 1953 |

FOREIGN PATENTS

| | | |
|---|---|---|
| 11,503 | Great Britain | Sept. 9, 1886 |
| 3,974 | Great Britain | Feb. 25, 1905 |
| 786,051 | France | June 3, 1935 |
| 167,783 | Austria | Feb. 26, 1951 |